(12) United States Patent
Mende et al.

(10) Patent No.: US 9,528,590 B2
(45) Date of Patent: Dec. 27, 2016

(54) DECOUPLER FOR DAMPING A TORQUE TRANSMISSION BETWEEN A DRIVE SHAFT OF A MOTOR VEHICLE AND A BELT PULLEY

(71) Applicant: SCHAEFFLER TECHNOLOGIES AG & CO. KG, Herzogenaurach (DE)

(72) Inventors: Hartmut Mende, Bühl (DE); Jürgen Kroll, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/653,825

(22) PCT Filed: Nov. 28, 2013

(86) PCT No.: PCT/DE2013/200321
§ 371 (c)(1),
(2) Date: Jun. 18, 2015

(87) PCT Pub. No.: WO2014/094760
PCT Pub. Date: Jun. 26, 2014

(65) Prior Publication Data
US 2015/0345610 A1 Dec. 3, 2015

(30) Foreign Application Priority Data
Dec. 19, 2012 (DE) .......................... 10 2012 223 728

(51) Int. Cl.
*F16H 55/14* (2006.01)
*F16D 3/00* (2006.01)
(Continued)

(52) U.S. Cl.
CPC ............. *F16H 55/36* (2013.01); *F16D 41/185* (2013.01); *F16F 15/134* (2013.01); *F16H 2055/366* (2013.01)

(58) Field of Classification Search
CPC .......... C08K 7/06; F16H 55/36; F16D 41/185; F16D 41/22
(Continued)

(56) References Cited

U.S. PATENT DOCUMENTS 2,291,407 A * 7/1942 Paul .................... F16D 43/2024
464/39
2,353,562 A * 7/1944 Hatcher .................... B64D 1/22
254/346
(Continued)

FOREIGN PATENT DOCUMENTS

DE 20 2007 005 899 U1 9/2007
DE 10 2009 004 713 A1 7/2009
(Continued)

OTHER PUBLICATIONS

International Search Report, dated Mar. 19, 2014, Issued by the ISA/EPO in Application No. PCT/DE2013/200321.
(Continued)

*Primary Examiner* — Henry Liu
(74) *Attorney, Agent, or Firm* — Alfred J. Mangels

(57) ABSTRACT

A decoupler for damping torque transmission irregularities between a vehicle drive shaft and a belt pulley for driving vehicle auxiliary components. The decoupler includes first and second ramp rings for transmitting torque delivered by the drive shaft to the belt pulley. A spring arrangement provides for axial engagement of the ramp rings. The ramp rings have respective sloped push and pull ramps directed toward the adjacent ramp ring so that in a coasting mode of the vehicle the ramp rings rotate relative to each other and in a vehicle drive mode the ramp rings are drawn toward one another. The decoupler includes a pulley damper for damping torque transmission irregularities to reduce noise emission.

16 Claims, 4 Drawing Sheets

(51) Int. Cl.

| | | |
|---|---|---|
| *F16H 55/36* | (2006.01) | |
| *F16H 9/00* | (2006.01) | |
| *F16H 59/00* | (2006.01) | |
| *F16H 61/00* | (2006.01) | |
| *F16H 63/00* | (2006.01) | |
| *F16D 41/18* | (2006.01) | |
| *F16F 15/134* | (2006.01) | |

(58) Field of Classification Search
USPC .................................................. 474/94, 70
See application file for complete search history.

(56) References Cited

U.S. PATENT DOCUMENTS

| | | | | |
|---|---|---|---|---|
| 2,398,570 | A * | 4/1946 | Wildhaber | F16D 11/14 |
| | | | | 192/108 |
| 3,017,977 | A * | 1/1962 | Settimi | F16D 45/00 |
| | | | | 192/103 A |
| 3,089,344 | A * | 5/1963 | Lafitte | F02N 15/067 |
| | | | | 192/108 |
| 3,596,446 | A * | 8/1971 | Bryan | A01D 34/6806 |
| | | | | 464/39 |
| 3,967,711 | A * | 7/1976 | Stroezel | F16D 7/044 |
| | | | | 192/108 |
| 4,053,980 | A * | 10/1977 | Poehlman | F16D 43/2024 |
| | | | | 192/48.5 |
| 4,062,203 | A * | 12/1977 | Leonard | B25B 23/141 |
| | | | | 464/38 |
| 4,185,511 | A * | 1/1980 | Blackburn | A23G 9/12 |
| | | | | 192/108 |
| 4,261,452 | A * | 4/1981 | Barrows | F02N 15/02 |
| | | | | 192/103 R |
| 4,299,404 | A * | 11/1981 | Svoboda | A63C 9/005 |
| | | | | 280/634 |
| 4,969,341 | A * | 11/1990 | Burk | D06F 37/40 |
| | | | | 192/108 |
| 5,110,003 | A * | 5/1992 | MacWilliams | B60K 15/0406 |
| | | | | 220/288 |
| 5,686,521 | A * | 11/1997 | Massengale | C08K 7/06 |
| | | | | 524/495 |
| 5,873,441 | A * | 2/1999 | Tsujishita | F16D 41/22 |
| | | | | 192/46 |
| 6,065,576 | A * | 5/2000 | Shaw | F16D 41/125 |
| | | | | 192/45.1 |
| 6,352,243 | B1 * | 3/2002 | Samejima | B66D 3/16 |
| | | | | 254/346 |
| 6,517,054 | B2 * | 2/2003 | Samejima | B66D 3/14 |
| | | | | 254/346 |
| RE38,498 | E * | 4/2004 | Ruth | F16D 41/125 |
| | | | | 188/82.8 |
| 6,863,165 | B2 * | 3/2005 | Koslowski | B25F 5/001 |
| | | | | 173/178 |
| 6,907,971 | B2 * | 6/2005 | Demir | F16D 41/22 |
| | | | | 192/46 |
| 8,272,982 | B2 * | 9/2012 | Fitz | F16H 55/36 |
| | | | | 464/37 |
| 8,365,892 | B2 * | 2/2013 | Sturgin | F16D 41/185 |
| | | | | 192/46 |
| 8,641,563 | B2 * | 2/2014 | Mende | F16F 15/1297 |
| | | | | 464/67.1 |
| 8,715,121 | B2 * | 5/2014 | Cali | F16D 3/02 |
| | | | | 474/94 |
| 8,757,341 | B2 * | 6/2014 | Klieber | B60B 27/047 |
| | | | | 192/110 B |
| 2003/0155204 | A1 * | 8/2003 | Demir | F16D 41/22 |
| | | | | 192/46 |
| 2010/0116614 | A1 * | 5/2010 | Sturgin | F16D 41/185 |
| | | | | 192/70.252 |
| 2010/0294608 | A1 | 11/2010 | Städele et al. | |
| 2011/0263365 | A1 * | 10/2011 | Mende | F16F 15/1297 |
| | | | | 474/94 |
| 2013/0324335 | A1 * | 12/2013 | Chen | F16D 41/206 |
| | | | | 474/94 |

FOREIGN PATENT DOCUMENTS

| | | |
|---|---|---|
| DE | 10 2011 086 185 A1 | 6/2012 |
| JP | H10 252857 A | 9/1998 |
| WO | WO 2005/028899 A1 | 3/2005 |
| WO | WO 2011/127898 A1 | 10/2011 |

OTHER PUBLICATIONS

Translation of the Written Opinion of the International Searching Authority, dated Jun. 23, 2015, issued in Application No. PCT/DE2013/200321.

* cited by examiner

DECOUPLER FOR DAMPING A TORQUE TRANSMISSION BETWEEN A DRIVE SHAFT OF A MOTOR VEHICLE AND A BELT PULLEY

CROSS-REFERENCE TO RELATED APPLICATIONS

This application is the U.S. national phase application under 35 U.S.C. §371 of International Application Serial No. PCT/DE2013/200321, having an international filing date of 28 Nov. 2013, and designating the United States, which claims priority based upon German Patent Application No. DE 10 2012 223 728.3, filed on 19 Dec. 2012, the entire contents of each of which applications are hereby incorporated by reference herein to the same extent as if fully rewritten.

BACKGROUND OF THE INVENTION

Field of the Invention

The present invention relates to a decoupler for damping the transmission of torque between a drive shaft of a motor vehicle and a belt pulley, with the aid of which rotational irregularities of the drive shaft can at least be damped, so that auxiliary assemblies connected to the belt pulley can be driven more uniformly by a drive means.

Description of the Related Art

From WO 2005/028899 A1, a crankshaft pulley decoupler for a motor vehicle is known, wherein a hub connected to a crankshaft of the motor vehicle has radially protruding lugs, which are coupled, through bow springs running in the circumferential direction, to a spring housing in which the bow springs are disposed. The spring housing is connected to a coil spring that encircles the spring housing radially outside, and which expands when there is an input of torque in the drive direction to bring about a frictional engagement with a belt pulley, in order to transmit the introduced torque to the pulley.

From DE 10 2009 004 713 A1, a pulley damper is known which has an input flange that is connectable to a drive shaft. Connected to the input flange through a free-wheel device is a torsional vibration damper, which is connected, in turn, directly to a belt pulley. The free-wheel device, which is situated between the input flange and the torsional vibration damper in the flow of force direction, has ramps bent up from a base plane, which make a free-wheel mechanism in the nature of a ratchet. In the push direction, an output disk of the free-wheel device can slide on the sloped flanks of the bent-up ramps, which moves the output disk axially without transmitting a torque from the input flange to the output flange. In the traction mode, the output disk can strike the tangentially backward-directed side of the bent-up ramp, and transmit a torque.

There is a constant need to refine decouplers so that unwanted torque transmission irregularities are avoided while noise emission is kept as low as possible.

An object of the present invention is to provide a decoupler with the aid of which unwanted torque transmission irregularities are avoided with negligible noise emission.

SUMMARY OF THE INVENTION

In accordance with the present invention, a decoupler is provided for damping torque transmission irregularities between a drive shaft of a motor vehicle and a belt pulley that serves for driving auxiliary assemblies with the aid of a drive means. The decoupler includes a first ramp ring for introducing a torque provided by the drive shaft, a second ramp ring which meshes with the first ramp ring to deliver a torque to an input flange of a belt pulley unit, and at least one spring arrangement for axial compression of the first ramp ring and of the second ramp ring, wherein the first ramp ring has a first push ramp directed toward the second ramp ring and/or the second ramp ring has a second push ramp directed toward the first ramp ring. The first push ramp and/or the second push ramp is sloped in the circumferential direction relative to the axial direction by a mean push angle $\alpha$ in such a way that in coasting mode the first ramp ring is rotated relative to the second ramp ring against the spring force of the spring unit. The first ramp ring has a first pull ramp directed away from the second ramp ring and/or the second ramp ring has a second pull ramp directed away from the first ramp ring, and the first pull ramp and/or the second pull ramp is sloped in the circumferential direction relative to the axial direction by a mean pull angle $\beta$ in such a way that in drive mode the first ramp ring and the second ramp ring are drawn toward one another.

The spring arrangement makes it possible to ensure that the first ramp ring is able to mesh with the second ramp ring in order to transmit torque. At the same time, it is possible for the first ramp ring to move away from the second ramp ring in an axial direction relative to the second ramp ring, against the spring force of the spring arrangement, when the second ramp ring overtakes the first ramp ring in coasting mode. In that case, the first ramp ring can slide on the second push ramp, and/or the second ramp ring on the first push ramp, so that rotation of the first ramp ring relative to the second ramp ring results without significant torque transmission, in the nature of a free-wheel mechanism. That makes it possible to prevent a belt pulley that is coupled with the second ramp ring from being braked in coasting mode, and to avoid impairing the functionality of the auxiliary assemblies driven by means of the pulley. Instead, in coasting mode the pulley and the second ramp ring can be decoupled from the drive shaft and the first ramp ring, thereby preventing any unwanted torque transmission in the coasting direction.

By the push ramp and the pull ramp of the one ramp ring, a tooth directed toward the other ramp ring can be formed, which can protrude in the axial direction, for example, from a disk-shaped basic body of the ramp ring, a plurality of teeth being situated one after the other at a common radius, in particular in the circumferential direction. The "fineness" resolution of the particular ramp ring can be set by means of the number of teeth and the extension of the respective tooth in the circumferential direction. Furthermore, the extension of the tooth in the axial direction ("tooth height") can be used to set the travel distance by which the first ramp ring must separate from the second ramp ring, so that the first ramp ring can rotate by one tooth pitch relative to the second ramp ring in coasting mode. In contrast to a ratchet however, the tooth cross section, when viewed in the radial direction, does not have the form of a right-angled trapezoid or right-angled triangle, but of a warped rectangle or warped triangle. An undercut can be formed by the pull ramp. The tooth cross section can resemble a parallelogram, for example, in which the legs are not parallel, and the edge opposite the base in particular may can have a length of approximately zero. The tooth cross section can have in particular the form of a concave trapezoid, where the edge opposite the base can have a length of approximately zero. As a result, the tooth cross section can correspond, for example, to the geometry of a sawtooth with a cutting angle of less than 90°, with the push ramp corresponding to the tooth back and the pull ramp to the tooth face. The pull ramp does not run parallel to an axis of rotation of the decoupler, but rather is oblique to the axis of rotation in the circumferential direction. As a result, in the pull direction the tooth of the one ramp ring can mesh with a corresponding opening or a corresponding tooth of the other ramp ring, so that a skewed plane is formed by the pull ramp relative to the circumferential direction, whereby the ramp rings are pulled together in the axial direction on the pull ramp as a result of the force component. The first ramp ring can be hooked together with the second ramp ring. Axial play of the first ramp ring relative to the second ramp ring can be eliminated thereby, so that rattling noises are prevented. In that way unwanted torque transmission irregularities can be avoided, with resulting low noise emission.

Traction mode is an operating state in which the first ramp ring overtakes the second ramp ring, and when there is a non-rotating connection of the first ramp ring to the second ramp ring a flow of torque takes place from the first ramp ring to the second ramp ring. If the decoupler is built into a belt pulley unit, in that operating state the drive shaft drives the belt pulley and the auxiliary units which are coupled with the belt pulley by the drive means. A mechanical coupling of the first ramp ring with the second ramp ring can be brought about by means of the pull ramp, so that the first ramp ring and the second ramp ring turn at the same speed and a flow of torque from the first ramp ring to the second ramp ring can occur.

Coasting mode is an operating state in which the second ramp ring overtakes the first ramp ring, and in the event of a non-rotating connection of the first ramp ring to the second ramp ring a flow of torque would take place from the second ramp ring to the first ramp ring. If the decoupler is built into a belt pulley unit, in that case the belt pulley and the auxiliary assemblies coupled with the belt pulley by the drive means would drive the drive shaft, and/or the auxiliary assemblies would not be driven by the drive shaft but slowed. In coasting mode, however, when the second ramp ring overtakes the first ramp ring, a mechanical coupling can be canceled by the push ramp in the manner of a freewheeling mechanism, so that an unintended slowing of the auxiliary assemblies is prevented.

The belt pulley unit can have a belt pulley with the aid of which auxiliary assemblies can be driven by a drive means. The belt pulley unit is designed in particular as a pulley damper, in which an additional torsional vibration damper can be provided, for example a rubber damper or a relatively rotating coupling of the belt pulley by means of a curved spring. The second ramp ring can be directly non-rotatably connected to the belt pulley, but the second ramp ring can preferably be connected to the belt pulley indirectly by means of a torsional vibration damper.

In particular, with the help of the first pull ramp a first wedge pointing toward the second ramp ring can be formed to be threaded into the second ramp ring, and/or with the help of the second pull ramp a second wedge pointing toward the first ramp ring can be formed to be threaded into the first ramp ring. By means of the wedge, at its tip a crest of the tooth can be formed, which can be driven into an opening and/or a correspondingly formed tooth of the other ramp ring when there is an input of torque in the pull direction, in order to pull the ramp rings toward one another. In particular, the tip of the wedge can be rounded, which can reduce load peaks in the tip of the wedge without significantly influencing the threading function. A sufficiently great spring force can be produced by the spring arrangement, so that when there is rotation of the first ramp ring in relation to the second ramp ring the wedge can be threaded reliably. In particular, the geometry of the tip of the wedge and the spring force of the spring arrangement are matched, so reliable threading is guaranteed in the event of a maximum torque jump that can be expected in the pull direction.

The first pull ramp preferably forms a first receiving pocket, in particular to receive a second wedge of the second ramp ring delimited by the second pull ramp, and/or the second pull ramp forms a second receiving pocket, in particular to receive a first wedge of the first ramp ring delimited by the first pull ramp. The receiving ramp is formed in particular so that the corresponding wedge can impact on a defined surface. For example, in the event of an input of torque in the pull direction, the wedge can impact on a tooth base of the receiving pocket, which results in an essentially rattle-free cohesion. For example, the wedge can impact on the tooth base with a surface, so that the forces that occur in the impact can be distributed over a larger area. To that end, the wedge and the tooth base can have in particular essentially parallel axial surfaces, which can be interrupted in the circumferential direction by the respective tooth. The axial surfaces are provided in particular in a radial plane of the decoupler.

By particular preference, the value of the mean push angle $\alpha$ is $3° \leq |\alpha| \leq 45°$, in particular $10° \leq |\alpha| \leq 40°$, preferably $20° \leq |\alpha| \leq 35°$ and by particular preference $25° \leq |\alpha| \leq 30°$. The value of the mean pull angle $\beta$ is $0° < |\beta| \leq 25°$, in particular $1° \leq |\beta| \leq 10°$, preferably $2° \leq |\beta| \leq 7°$ and by particular preference $3° \leq |\beta| \leq 5°$. The mean push angle results in a sloping plane for the push ramp, which in consideration of the expected coefficients of friction of the contact surfaces in the area of the push ramp enables simple sliding on the push ramp. The mean pull angle, in consideration of the expected coefficients of friction of the contact surfaces in the area of the pull ramp, enables sliding on the one hand and good producibility on the other hand. As a result, the respective ramp ring can still be shaped comparatively simply by a tool. Furthermore, the pull ramp guarantees reliable threading and good torque transmission. The push ramp and/or the pull ramp are in particular essentially radially oriented. The mean push angle and/or the mean pull angle is/are therefore measured centrally in the essentially radial extension of the push ramp and/or pull ramp. The mean push angle $\alpha$ corresponds to an acute angle which is enclosed between the surface of the push ramp and an imaginary axial line which runs parallel to the axis of rotation through a furthest projecting edge of the push ramp in the area of the tooth crest. The mean pull angle $\beta$ corresponds to an acute angle which is enclosed between the surface of the pull ramp and an imaginary axial line which runs parallel to the axis of rotation through a furthest projecting edge of the pull ramp in the area of the tooth crest. In comparison to a pull angle $\beta$ which would result from a trapezoid-shaped design of the tooth, the pull angle is negative, which results in a negative tooth angle.

In particular, the first ramp ring and/or the second ramp ring is/are made of a plastic material, in particular fiber-reinforced plastic. Because of the greater elasticity of the plastic material in comparison to metal, a low-noise response behavior of the decoupler can be achieved. Furthermore, smaller production tolerances are possible. Because of harder inlays and/or fibers, adequate strength can be achieved. The first ramp ring and/or the second ramp ring can be produced in particular by plastic injection molding. To that end, a two-piece mold in particular can be used, where for the removal of the part a first half of the mold, which forms the back side that faces away from the other ramp ring and the radially inner and/or radially outer projections, can be removed in the axial direction. A second mold half, which essentially forms the teeth of the particular ramp ring, can be rotated along the push ramp by a small angular amount, until the second mold half can be removed in the axial direction past the pull ramp.

The first ramp ring and/or the second ramp ring preferably has/have a friction-reducing material, in particular PTFE, in particular in the area of the push ramp and/or in the area of the pull ramp. Preferably, the friction-reducing material is provided as a coating which is applied completely or partially to a surface of the push ramp and/or the pull ramp. It is also possible to form the coating by immersing the particular ramp ring into the liquid coating material. Preferably, polytetrafluoroethylene (PTFE) can be used as the friction-reducing material, providing an especially low coefficient of friction.

By particular preference, the spring arrangement has at least one first spring element and at least one second spring element, with the first ramp ring and the second ramp ring being situated between the first spring element and the second spring element in the axial direction. That makes it possible to have both the first ramp ring and the second ramp ring move away axially in coasting mode, so that no one ramp ring has to be moved the entire axial distance. That prevents excessive wear of a single ramp ring, therefore prolonging the life of the decoupler. The spring elements can operate in particular in series, resulting in a soft spring characteristic for the spring arrangement and allowing a greater disengagement distance. The spring elements can also operate in parallel, resulting in a stiffer spring characteristic for the spring arrangement and allowing a greater spring force. Furthermore, when there are more than two spring elements it is possible to provide for both series and parallel operation of the spring elements, in order to set a desired spring characteristic for the spring arrangement. In particular, if a diaphragm spring is used for at least one spring element, suitable interconnection of the spring elements can be provided while requiring little construction space.

The invention also relates to a pulley damper for torsional vibration damping of torque delivered by a drive shaft of a motor vehicle. The pulley damper includes a hub for connecting to the drive shaft, a belt pulley for driving auxiliary assemblies with the aid of a drive means, an input flange that is rotatable in relation to the pulley to introduce torque into the pulley, and an energy storage element interposed between the input flange and the pulley, in particular a curved spring, to transmit torque from the input flange to the pulley. A decoupler is coupled with the hub and the input flange, which can be constructed and refined as described earlier. Transmission of torque in the push direction can be prevented by the decoupler, while at the same time axial play between the first ramp ring and the second ramp ring in the drive mode can be eliminated, thereby avoiding rattling noises. In that way unwanted torque transmissions can be avoided in the pulley damper with low noise emission.

The auxiliary assembly is, for example, a cooling water pump, an oil pump, an air conditioning compressor of an air conditioning system, a fuel pump, a generator, lubricant pump, or a mechanical charger/compressor for intake air compression in turbo-chargeable motor vehicle engines. The drive means can be in the form of a cable, a belt, in particular a flat belt or V-belt, in particular a poly-V-belt, a chain, or the like. The drive means is in particular fiber-reinforced and/or has at least one metal wire, so that it has especially high tensile strength.

The belt pulley is supported by means of a radial bearing so that it is rotatable relative to the hub, the radial bearing being designed as a roller bearing. Since the radial bearing is designed not as a journal bearing but as a roller bearing, great radial forces can be withstood without special lubricant requirements. Axial forces between the belt pulley and the hub can be withstood by means of an axial journal bearing.

The belt pulley preferably forms a sealed receiving chamber that accommodates the energy storage element, wherein the receiving chamber contains a lubricant, in particular lubricating grease, and the decoupler is situated entirely inside the receiving chamber. That enables the decoupler also to be lubricated by the lubricant provided for the energy storage element, so that the friction between the first ramp ring and the second ramp ring can be further reduced.

The invention also relates to a belt drive having a drive shaft, in particular a crankshaft, of a motor vehicle engine, and a pulley damper connected to the drive shaft. The pulley damper can be constructed and refined as described earlier, it can include a drive means that is drivable by the pulley of the pulley damper, and it can include at least one auxiliary assembly for the motor vehicle that is drivable by the drive means. Unwanted transmission of torque in the push direction can be prevented by the pulley damper, while at the same time axial play between the first ramp ring and the second ramp ring in the drive mode can be eliminated, so that rattling noises are avoided. In that way unwanted torque transmissions can be avoided in the pulley damper with low noise emission.

BRIEF DESCRIPTION OF THE DRAWINGS

The invention will be further described below by way of an example, with reference to the accompanying drawings, on the basis of preferred exemplary embodiments; the features described below can each relate to an aspect of the invention, both individually and in combination. The drawing figures show the following.

DESCRIPTION OF THE PREFERRED EMBODIMENTS

Figure 1:
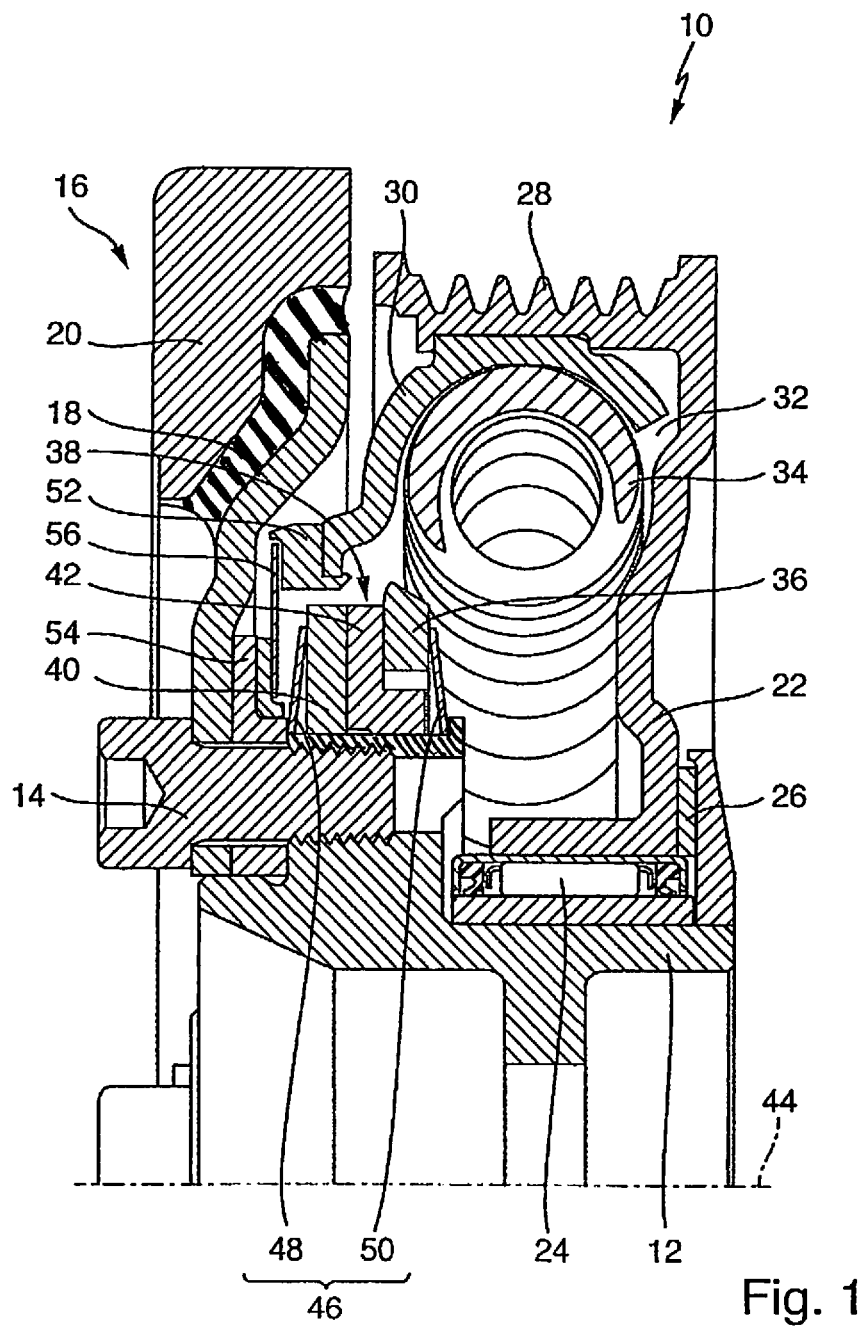
FIG. 1 is a cross-sectional view of a pulley damper in accordance with one aspect of the present invention.

The pulley damper 10 shown in FIG. 1 includes a hub 12, which can be connected to an input shaft, in particular a crankshaft, of a motor vehicle engine. A torsional vibration damper 16 in the form of a rubber damper is connected to the hub 12 by means of an attaching screw 14, wherein the torsional vibration damper 16 includes an inertial mass 20 that is connected to the damper by means of an elastic element 18, in particular an elastomeric material. A belt pulley 22 is supported on the hub 12. The pulley 22 is supported on the hub 12 by means of a radial bearing 24 in the form of a roller bearing, and by an axial bearing 26 in the form of a journal bearing. Radially outwardly the pulley 22 has an outer profile 28, in particular in order to engage with a drive means in the form of a poly-V-belt, by which auxiliary components of a motor vehicle can be driven. Connected to the pulley 22 is a cover 30, which bounds a receiving chamber in which an energy storage element in the form of a curved spring 34 is accommodated. The curved spring 34 is supported at one end by the cover 30 and/or the pulley 22, and at an opposite end by an input flange 36, so that by rotation of the input flange 36 relative to the pulley 22 rotational irregularities that develop, in particular due to combustion strokes in the vehicle engine and/or the inertial forces that arise when a crankshaft is connected, can at least be damped.

In the flow of torque from the hub 12 to the pulley 22, a decoupler 38 is provided between the hub 12 and the input flange 36. The decoupler 38 has a first ramp ring 40 which is connected to the hub 12, in particular non-rotatingly, and a second ramp ring 42 that meshes with the first ramp ring, which is non-rotatably connected to the input flange 36. The first ramp ring 40 and the second ramp ring 42 are movable in an axial direction parallel to an axis of rotation 44. The first ramp ring 40 and the second ramp ring 42 are pressed together with the aid of a spring arrangement 46. In the illustrated exemplary embodiment, the spring arrangement 46 includes a first spring element 48 in the form of a diaphragm spring, and a second spring element 50 in the form of a diaphragm spring. The first spring element 48 is supported indirectly on the hub 12, and presses axially against the first ramp ring 40. The second spring element 50 is supported on the hub 12, and presses indirectly by means of the input flange 36 axially against the second ramp ring 42. To seal the receiving chamber 32, an outer sealing ring 52 is connected to the cover 30, while an inner sealing ring 54 is connected to the hub 12. A sealing disk 56 is spring-clamped between the outer sealing ring 52 and the inner sealing ring 54, so that with the aid of the sealing disk 56 rotation of the outer sealing ring 52 relative to the inner sealing ring 54 is enabled. The inner sealing ring 54 is situated in such a way that the decoupler 38 is positioned between the sealing disk 56 and the pulley 22, so that the decoupler 38 is arranged inside the receiving chamber 32 bounded thereby.

Figure 2:
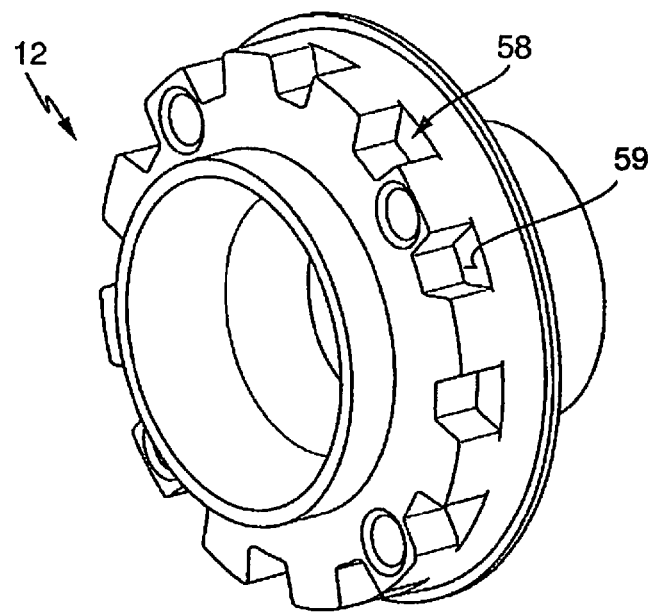
FIG. 2 is a perspective view of the hub of the pulley damper shown in FIG. 1.
Figure 3:
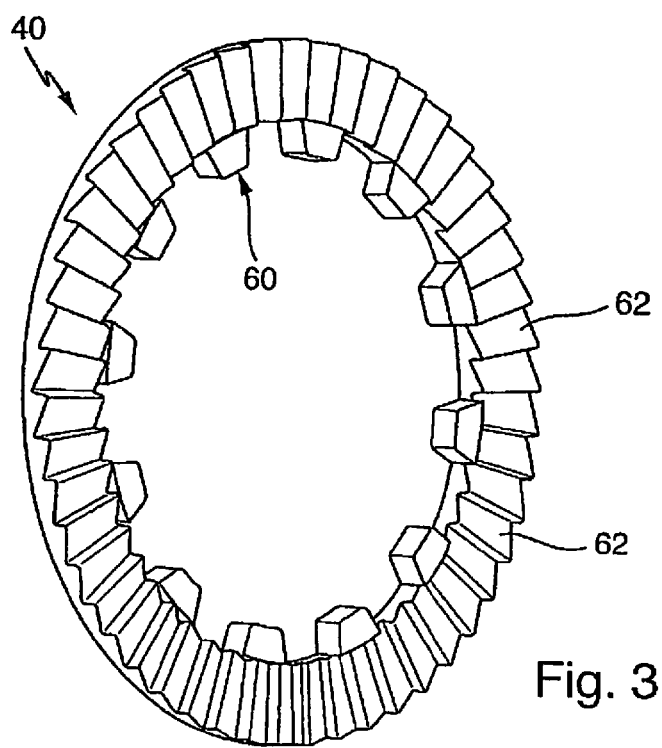
FIG. 3 is a perspective view of the first ramp ring of a decoupler for the pulley damper shown in FIG. 1.

As shown in FIG. 2, the hub 12 includes tooth-receiving recesses 58, into which inner teeth 60 of the first ramp ring 40, shown in FIG. 3, can be received. To that end, the first ramp ring 40 can be installed sideways axially onto the hub 12 until the inner teeth 60 contact first axial stop surfaces 59 within the hub tooth-receiving recesses 58.

Figure 4:
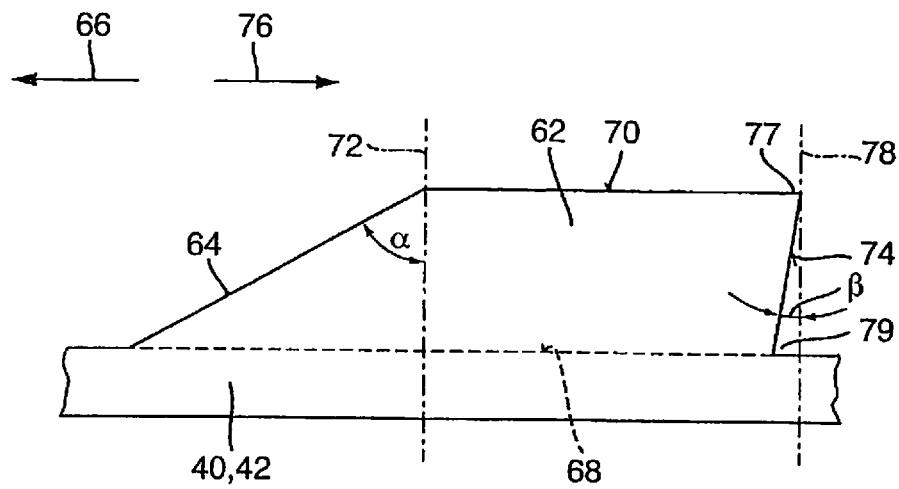
FIG. 4 is a fragmentary view of an unrolled portion of the first ramp ring shown in FIG. 3 along a central cutting line showing the form of an outer tooth as viewed in the circumferential direction of the first ramp ring.

The first ramp ring 40 and/or the second ramp ring 42 have a plurality of teeth 62 situated circumferentially on a common radius, opposite teeth of the respective other ramp ring 42, 40; one tooth 62 is shown in enlarged and fragmentary form in FIG. 4, by way of example. The tooth 62 shown in the illustrated embodiment of the first ramp ring 40 and/or the second ramp ring 42 includes a push ramp 64, which can slide on teeth of the other ramp ring 42, 40 in a push direction 66 in the event of relative sliding movement of the respective teeth 62.

In the illustrated exemplary embodiment, the teeth 62 are of trapezoidal form when viewed in a radial direction of the respective ramp ring, having a base 70 opposite the foundation 68 and that faces the other ramp ring 42, 40. At a point of the push ramp 64 furthest away from the assigned ramp ring 40, 42, the push ramp 64 can transition into the base 70. Between a first axial line 72 parallel to the axis of rotation 44, which runs through that transition region, and the surface of push ramp 64, a mean push angle α is defined. Oppositely facing and spaced from the push ramp 64 of tooth 62, a pull ramp 74 that extends between the foundation 68 and the base 70 is provided, which can pull the other ramp ring 42, 40 to its own ramp ring 40, 42 in the event of relative movement of the tooth 62 in a pull direction 76. Between a second axial line 78 parallel to the axis of rotation 44, which second axial line 78 runs through a point at which the outer end surface of pull ramp 74 intersects the base 70, and the surface of pull ramp 74 a mean pull angle β is defined. It is also possible to shorten the length of tooth 62 in the circumferential direction so severely that the base 70 is eliminated and the first axial line 72 coincides with the second axial line 78. In that case, the pull ramp 74 adjoins the push ramp 64 essentially directly, so that an essentially sawtooth-shaped cross section results for the tooth 62. In the transition region of the pull ramp 74 to the base 70, or to the push ramp 64, the tooth 62 forms a wedge 77, while at the same time between the pull ramp 74 and the foundation 68 a receiving pocket 79 is formed, in particular to receive part of a correspondingly formed tooth 62 of the other ramp ring 42, 40.

Figure 5:
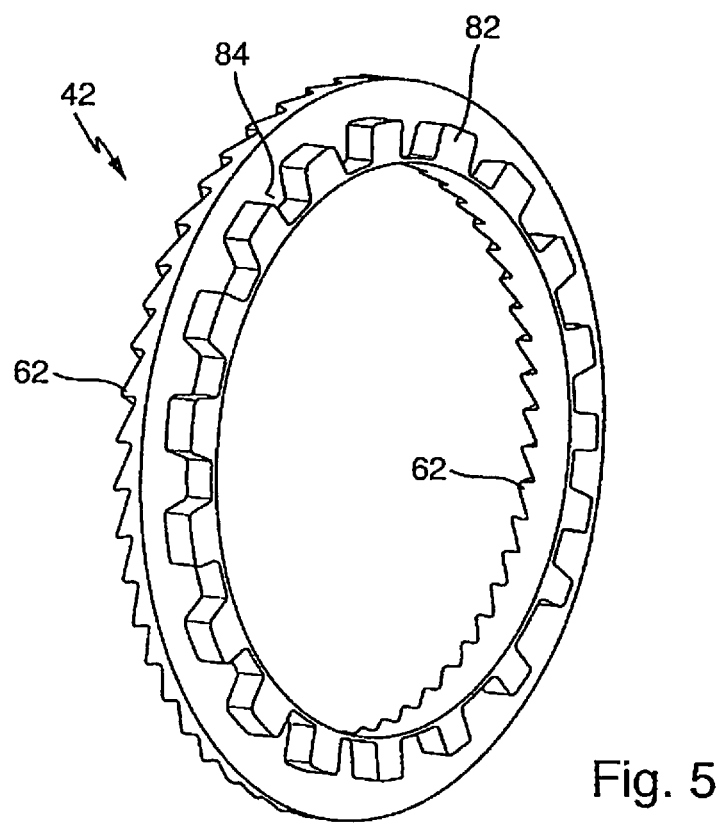
FIG. 5 is a perspective view of the second ramp ring of the decoupler for the pulley damper shown in FIG. 1.
Figure 6:
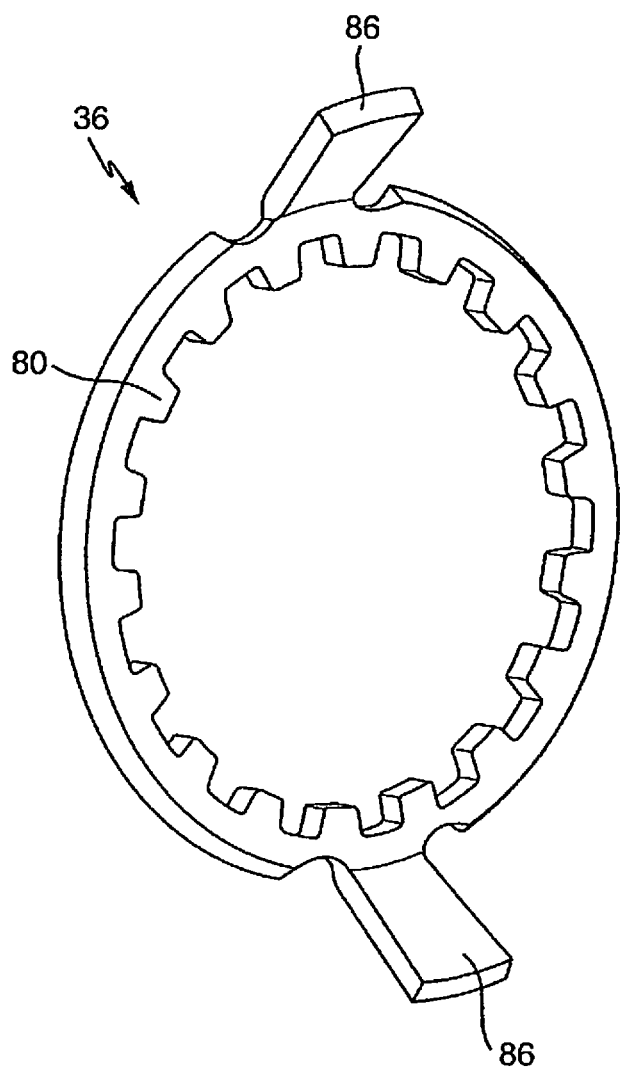
FIG. 6 is a perspective view of the input flange of the pulley damper shown in FIG. 1.

As shown in FIG. 5 and in FIG. 6, the input flange 36 includes spaced flange teeth 80 that extend radially inwardly, between which spaces externally extending teeth 82 of the second ramp ring 42 can be received. To that end, the input flange 36 can be installed sideways axially onto the second ramp ring 42 until the flange teeth 80 received between the external teeth 82 contact a second axial stop 84. The input flange 36 also includes projections 86 that extend radially outwardly, which can contact a respective curved spring 34.

What is claimed is:

1. A decoupler for damping torque transmission irregularities between a drive shaft of a motor vehicle and a belt pulley that drives auxiliary assemblies of the vehicle by a drive means, said decoupler comprising:
   a first ramp ring for introducing torque delivered to the first ramp ring by the drive shaft,
   a second ramp ring that axially engages with the first ramp ring to deliver torque to an input flange of a belt pulley, and
   at least one spring arrangement to press the first ramp ring and the second ramp ring together axially, wherein the spring arrangement includes at least one first spring element and at least one second spring element, wherein the first ramp ring and the second ramp ring are positioned between the first spring element and the second spring element in the axial direction of the decoupler,
   wherein the first ramp ring carries a first push ramp that is directed toward the second ramp ring and the second ramp ring carries a second push ramp that is directed toward the first ramp ring, and the first push ramp and the second push ramp are each sloped in a circumferential direction relative to the axial direction of the decoupler by a mean push angle α so that in a coasting mode of the vehicle the first ramp ring is rotated relative to the second ramp ring against the spring force of the spring arrangement, and
   wherein the first ramp ring includes a first pull ramp that is directed away from the second ramp ring and the second ramp ring includes a second pull ramp that is directed away from the first ramp ring, and the first pull ramp and the second pull ramp are each sloped in a circumferential direction of the decoupler relative to the axial direction by a mean pull angle β so that in a drive mode of the vehicle the first ramp ring and the second ramp ring are drawn toward each another.

2. The decoupler according to claim 1, wherein at least one of the first pull ramp of the first ramp ring includes a first wedge that is directed toward the second ramp ring for engagement with the second ramp ring, and the second pull ramp of the second ramp ring includes a second wedge that is directed toward the first ramp ring for engagement with the first ramp ring.

3. The decoupler according to claim 1, wherein at least one of the first pull ramp of the first ramp ring includes a first receiving pocket to receive a second wedge of the second ramp ring which is bounded by the second pull ramp, and the second pull ramp includes a second receiving pocket to receive a first wedge of the first ramp ring which is bounded by the first pull ramp.

4. The decoupler according to claim 1, wherein a value of the mean push angle α is $3° \leq |\alpha| \leq 45°$, a value of the mean pull angle β is $0° < |\beta| \leq 25°$.

5. The decoupler according to claim 1, wherein at least one of the first ramp ring and the second ramp ring is made of a plastic material.

6. The decoupler according to claim 1, wherein at least one of the first ramp ring and the second ramp ring includes a friction-reducing material on at least one of the push ramp and the pull ramp.

7. A pulley damper for torsional vibration damping of torque irregularities delivered by a drive shaft of a motor vehicle, said pulley damper comprising:
a hub for connection with the drive shaft, a belt pulley for driving vehicle auxiliary assemblies by a drive means,
an input flange that is rotatable in relation to the belt pulley to introduce torque into the belt pulley,
an energy storage element interposed between the input flange and the pulley to transmit torque from the input flange to the belt pulley, and
a decoupler in accordance with claim 1 that is coupled with the hub and with the input flange.

8. The pulley damper according to claim 7, wherein the belt pulley is rotatably supported on the hub by a radial bearing.

9. The belt pulley damper according to claim 7, wherein the belt pulley includes a sealed receiving chamber that receives the energy storage element, wherein the receiving chamber contains a lubricant, and wherein the decoupler is contained entirely the receiving chamber.

10. The decoupler according to claim 4, wherein the value of the mean push angle α is $10° \leq |\alpha| \leq 40°$, and the value of the mean pull angle is $1° \leq |\beta| \leq 10°$.

11. The decoupler according to claim 4, wherein the value of the mean push angle α is $20° \leq |\alpha| \leq 35°$, and the value of the mean pull angle is $2° \leq |\beta| \leq 7°$.

12. The decoupler according to claim 4, wherein the value of the mean push angle α is $25° \leq |\alpha| \leq 30°$, and the value of the mean pull angle is $3° \leq |\beta| \leq 5°$.

13. The decoupler according to claim 5, wherein the plastic material is fiber reinforced.

14. The decoupler according to claim 6, wherein the friction reducing material is polytetrafluoroethylene.

15. The decoupler according to claim 7, wherein the energy storage element is a curved coil spring.

16. The decoupler according to claim 8, wherein the radial bearing is a roller bearing.

* * * * *